United States Patent Office 3,021,496
Patented Feb. 13, 1962

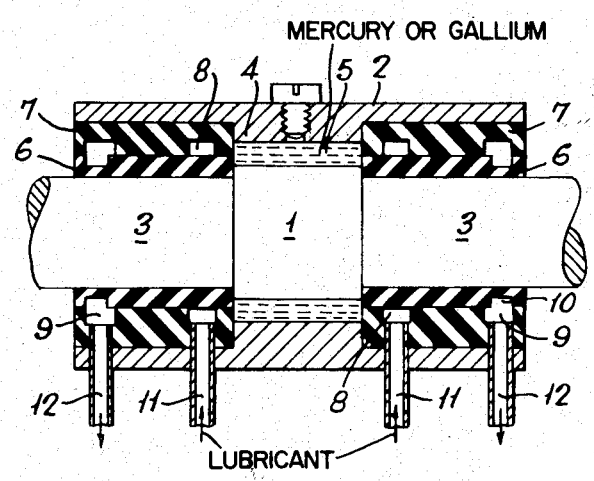

3,021,496
LIQUID ELECTRICAL CONNECTIONS BETWEEN RELATIVELY ROTATING ELECTRICAL CONDUCTORS
Harold Frederick Kenyon, Reading, England, assignor to Metropolitan-Vickers Electrical Company Limited, London, England, a British company
Filed Mar. 27, 1959, Ser. No. 802,444
Claims priority, application Great Britain Mar. 31, 1958
3 Claims. (Cl. 339—5)

This invention relates to electrical connections between relatively rotating electrical conductors.

The invention is concerned with contacts of the kind comprising a liquid metal (e.g. mercury) filled annular space bordered on one side by one of said conductors and on another side by the other conductor so that the liquid metal provides a continuous electrical connection between the relatively rotating members.

In such arrangements it is necessary to seal the liquid metal space between the relatively rotating conductors against leakage and in prior arrangements this has been effected by sealing members connected to each of said conductors and of a material which is not wetted by the liquid metal and between which are relatively rotating sealing surfaces to which there is a small clearance so as to avoid the escape of liquid metal. The sealing surfaces may also act as mechanical bearings.

In arrangements of this kind, as proposed hitherto, it has been necessary both to allow for thermal expansion of the liquid metal and to lubricate the sealing surfaces and for this purpose the liquid metal space has been partially filled with a lubricant; the lubricant being able to wet the sealing surfaces spreads between them and lubricates them. If the liquid metal expands, more oil is forced between the surface and if it retracts the oil is retracted into the liquid metal space.

With such arrangements, however, particularly in arrangements in which the sealing surface is extended to provide a bearing surface, it has been found that there is a tendency under rotation for pressure differences to be set up by the oil in an axial direction between the bearing surfaces and this has tended to cause the liquid metal to be squirted out in fine droplets between the bearing surfaces.

The main object of the invention is to provide an improved arrangement which avoids this disadvantage.

According to the present invention an electrical connection between relatively rotating inner and outer conductors of the kind comprising an annular space filled with liquid metal and extending between the conductors so as to provide a continuous electrical connection between said conductors includes a mechanical bearing for the rotating member on each side of the liquid metal annulus, the co-acting surfaces of said bearings being of a material not wetted by the liquid metal and with a small clearance so as to act as a liquid metal seal together with circumferential inlet channeling for lubricant around the bearing surface at a position axially adjacent the liquid metal annulus and circumferential outlet channeling around the bearing at a position axially remote from the liquid metal annulus.

Preferably the outer conductor is fixed and the inner conductor rotates. The liquid metal is preferably mercury though other liquid metals such as gallium which are liquid at relatively low temperatures can be used.

In carrying out the invention there would be provided means for supplying liquid lubricant to the first channeling and means for draining liquid lubricant from the second channeling.

It has been found that such an arrangement tends to relieve the lubricant pressure gradient axially along the bearing to avoid the mercury being forced out.

Furthermore any trace of mercury which does percolate between the bearing surfaces is carried away in the outlet lubricant.

In order that the invention may be more clearly understood reference will now be made to the accompanying drawing which shows diagrammatically one embodiment of the invention.

In the drawing the reference 1 indicates the rotating inner conductor and 2 the outer stationary conductor. The inner conductor 1 is carried on a shaft 3. Between the inner conductor 1 and a thickened portion 4 of the outer member is a mercury filled annulus 5 which provides the electrical connection between the conductors 1 and 2. A mechanical bearing on each side of the mercury annulus is provided by an inner sleeve 6 fixed around the shaft 3 and an outer sleeve 7 which is fixed within the outer conductor 2. These sleeves are of material which is not wetted by the mercury for example Bakelite and form a seal to the mercury annulus able to withstand appreciable pressure. At a point axially adjacent the mercury annulus is an inlet channel 8 which extends circumferentially around the outer sleeve 7 adjacent the bearing surface. Also extending around the outer sleeve 7 at a point axially remote from the mercury annulus is an outlet channel which, as shown, is formed with a co-operating channel 10 in the inner surface. Inlet supply ducts 11 feed lubricant into the space 8 from whence it percolates along the bearing surface and is drained from the outlet channel 9 by way of the outlet duct 12.

It has been found that by providing channels 8 to relieve pressure differences in the lubricant it is possible substantially to avoid any mercury being forced out of the annular compartment 5. Moreover, by removing the spent oil through the outlet channels 9, it is ensured that no trace of mercury which it may contain can escape from the ends of the bearings.

While the channels 8 have been shown as formed in the outer sleeve they could equally well be formed in the inner sleeve or even in both sleeves. Similarly, in the case of the outlet channel this could be formed only in the inner sleeve or only in the outer sleeve or in both sleeves, as shown. While in the specific embodiment shown the outer conductor is fixed and the inner conductor rotates it will be understood that the invention is applicable to arrangements in which the inner conductor is fixed and the outer conductor rotates. In such cases the lubricant could be supplied through passages extending axially through the inner member.

What I claim is:

1. An electrical connection between relatively rotating inner and outer conductors, comprising surfaces defining an annular channel between said conductors, a liquid metal filling to said annular channel providing a continuous electrical connection between said conductors, a mechanical bearing for the rotating conductors on each side respectively of the annular channel, said bearings having co-acting surfaces of a material not wetted by the liquid metal with a small clearance so as to act as a liquid metal seal, surfaces defining an inlet lubricant channel around each of said bearings, surfaces defining an outlet lubricant channel around each of said bearings, the inlet lubricant channels being located between the liquid metal channel and the respective outlet lubricant channel, means for supplying lubricant to each inlet channel whereby said lubricant will flow axially along said co-acting surfaces towards the respective outlet channels, and means for draining the lubricant from each said outlet channel.

2. An electrical connection between relatively rotating inner and outer conductors, comprising surfaces defining an annular channel between said conductors, a mercury filling to said annular channel providing a continuous electrical connection between said conductors, a mechanical bearing for the rotating conductors on each side respectively of the annular channel, said bearings having co-acting surfaces of a material not wetted by the mercury with a small clearance so as to act as a mercury seal, surfaces defining an inlet lubricant channel around each of said bearings, surfaces defining an outlet lubricant channel around each of said bearings, the inlet lubricant channels being located between the mercury channel and the respective outlet lubricant channel, means for supplying lubricant to each inlet channel whereby said lubricant will flow axially along said co-acting surfaces towards the respective outlet channels, and means for draining the lubricant from each said outlet channel.

3. An electrical connection between an outer fixed conductor and an inner conductor rotatable within the outer conductor, comprising surfaces defining an annular channel between said conductors, a liquid metal filling to said annular channel provinging a continuous electrical connection between said conductors, a mechanical bearing for the rotating conductors on each side respectively of the annular channel, said bearings having co-acting surfaces of a material not wetted by the liquid metal with a small clearance so as to act as a liquid metal seal, surfaces defining an inlet lubricant channel around each of said bearings, and surfaces defining an outlet lubricant channel around each of said bearings, the inlet lubricant channels being located between the liquid metal channel and the respective outlet lubricant channel, means for supplying lubricant to each inlet channel whereby said lubricant will flow axially along said co-acting surfaces towards the respective outlet channels, and means for draining the lubricant from each said outlet channel.

References Cited in the file of this patent

UNITED STATES PATENTS

| | | |
|---|---|---|
| 2,702,890 | Hildebrandt | Feb. 22, 1955 |
| 2,832,056 | Stutzmann | Apr. 22, 1958 |
| 2,869,007 | Ringland | Jan. 13, 1959 |

FOREIGN PATENTS

| | | |
|---|---|---|
| 183,836 | Great Britain | Sept. 13, 1923 |